United States Patent [19]

Vaughn

[11] 4,153,639

[45] May 8, 1979

[54] PROCESS FOR INTIMATELY BLENDING THERMOPLASTIC RESINS WITH ADDITIVES

[75] Inventor: Howard A. Vaughn, Schenectady, N.Y.

[73] Assignee: General Electric Company, Waterford, N.Y.

[21] Appl. No.: 597,150

[22] Filed: Jul. 18, 1975

[51] Int. Cl.² ............................................. C08L 83/04
[52] U.S. Cl. ..................................... 260/827; 203/95; 203/96; 260/824 R; 260/873; 260/876 R
[58] Field of Search ............. 260/827, 824, 873, 876R; 528/500; 203/96, 95

[56] References Cited

U.S. PATENT DOCUMENTS

| | | | |
|---|---|---|---|
| 3,179,642 | 4/1965 | Pflegerl | 528/500 |
| 3,384,599 | 5/1968 | Omietanski | 260/824 R |
| 3,511,788 | 5/1970 | Keil | 260/824 R |
| 3,526,651 | 9/1970 | Rossmy | 260/824 R |
| 3,590,026 | 6/1971 | Carlson | 528/500 |
| 3,629,310 | 12/1971 | Bailey | 260/824 R |
| 3,639,363 | 2/1972 | Marshall | 528/500 |
| 3,640,980 | 2/1972 | Baba | 528/500 |
| 3,652,515 | 3/1972 | Love | 528/500 |
| 3,729,450 | 4/1973 | Galiano | 528/500 |
| 3,751,402 | 8/1973 | Broering | 528/500 |
| 3,775,389 | 11/1973 | Hundmeyer | 528/500 |
| 3,865,897 | 2/1975 | Falender | 260/827 |
| 3,941,664 | 3/1976 | Scoggin | 203/95 |

FOREIGN PATENT DOCUMENTS

| | | | |
|---|---|---|---|
| 1115897 | 5/1968 | United Kingdom | 260/824 R |
| 1329572 | 9/1973 | United Kingdom | 260/824 R |

*Primary Examiner*—Paul Lieberman
*Attorney, Agent, or Firm*—Morgan, Finnegan, Pine, Foley & Lee

[57] ABSTRACT

A method is provided for uniformly blending thermoplastic resins and additives and for recovering them in a particulate form. The resin and normally difficult to compound additive, e.g., a silicone gum, are mixed into a liquid medium having a component which vaporizes readily. The liquid medium is then contacted with flowing live steam in a conduit and the mixture is fed into a closed chamber from which the superheated, vaporized liquid components and steam are removed overhead and in which the blended product forms particles. The particulate product is then collected.

11 Claims, 1 Drawing Figure

U.S. Patent     May 8, 1979     4,153,639
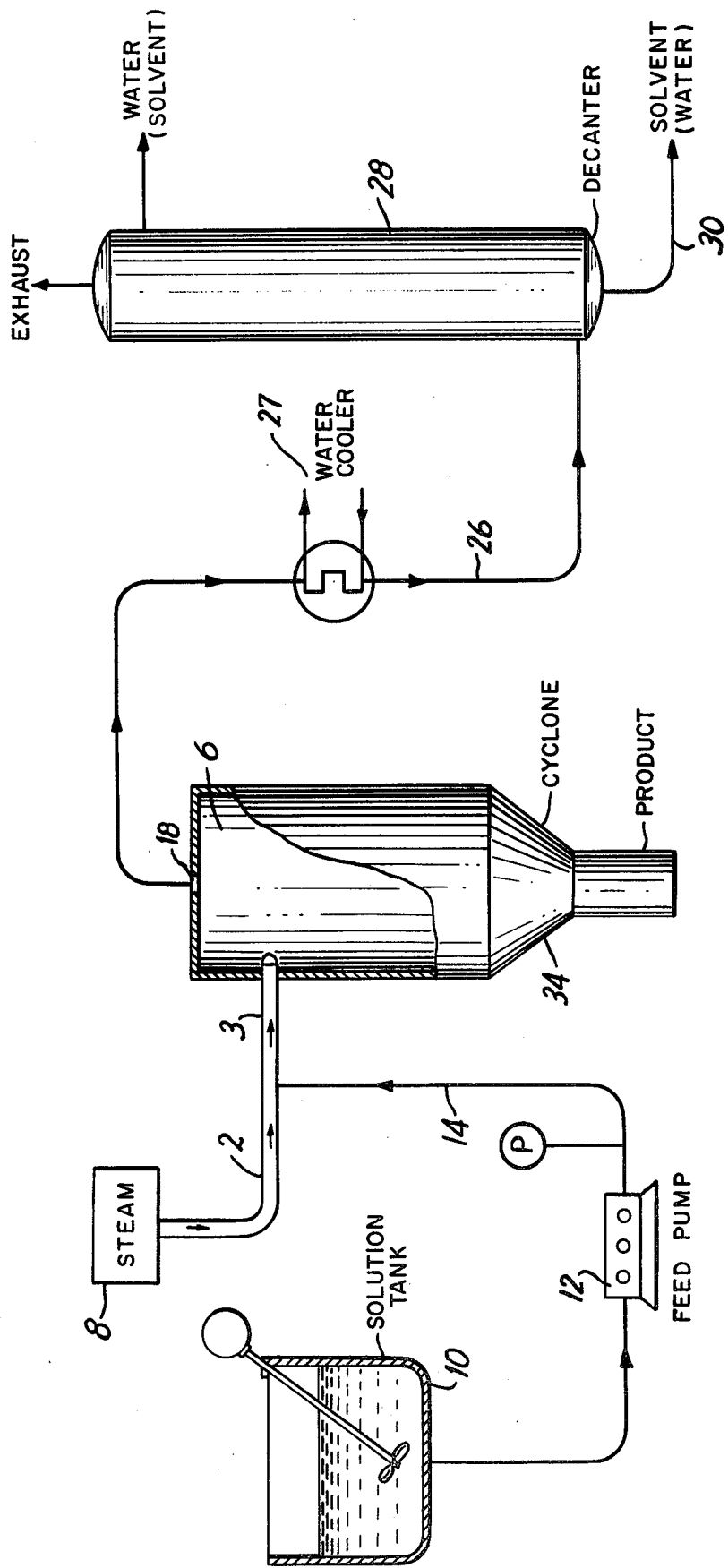

PROCESS FOR INTIMATELY BLENDING THERMOPLASTIC RESINS WITH ADDITIVES

This invention relates to a process for blending thermoplastic resins and additives. More particularly, it relates to blending and recovery of particulate resinous compositions consisting of at least one thermoplastic resin and an additive therefor (which can also be a thermoplastic resin).

BACKGROUND OF THE INVENTION

In the blending of pigments, vulcanizing aids, processing oils, plasticizers, silicones and other additives into thermoplastic resins, attaining uniform dispersions is a problem. Heated mixing machines such as dough-mixers or Banbury mixers can be used in which case the mixing is done on the melt. This requires a lot of energy. A 300 horsepower Banbury mixer can handle a 150 pound batch of polystyrene. Powdered additives or liquids can be blended into thermoplastics in the powder form using a ribbon or zig-zag blender. A masterbatch of liquid in polymer powder is often blended with more powder to get better dispersions. Extruders with mixing screws are used to blend powders while at the same time producing strands to be chopped into pellets. This does not always work well. For example, dimethylpolysiloxane gum has been blended into polystyrene by feeding gum and pellets simultaneously to an extruder. However, even after a second extrusion, blends made in an extruder are not uniform. Furthermore, pellets are not desirable for some applications. Specifically, glass reinforced thermoplastics are best made using a blend of polymer powder and the chopped glass strand, and not pellets.

There has not been discovered a simple, efficient method for blending additives, in particular, silicone gums, with thermoplastics to yield uniform mixtures in the form of powders. A solution of the thermoplastic and additive is made in a low boiling solvent, e.g., methylene chloride. This solution is then run through a conduit intimately mixed with live steam. The discharge is fed into a closed chamber and the product in the form of a damp powder is recovered at the bottom of the chamber. The powder can be further dried in an air circulating oven or by other means. It is then ready for melt fabrication into pellets or directly into a finished part. The appearance of compression molded sheets indicates that blends made in this fashion are uniform. In contrast, other mixing techniques, such as extrusion, would not produce such uniform blends.

It is believed that the system functions somewhat like a steam distillation apparatus. The polymer solution is injected into a jet of live steam and through a long tail pipe conduit. Polymer powder (crumb) comes out the bottom of the chamber, e.g., a cyclone at the end, and steam and solvent vapor go off overhead either to the atmosphere or to a condensing and solvent recovery system. Even if the additives are not completely soluble in the polymer solution, but are soluble in the solvent, the two solutions can be kept well agitated in the feed tank as they are being injected into the jet of steam.

In addition to remarkably uniform blending, the novel process has the following advantages over those described in the prior art: (i) lower energy cost; (ii) simpler equipment; and (iii) it permits intimate blending of very small amounts of additive throughout the powder particles.

DESCRIPTION OF THE DRAWING

In the drawing is illustrated, in flow diagram form, an arrangement of process equipment adapted for carrying out the process of the present invention.

SUMMARY OF THE INVENTION

According to the present invention there is provided a process for producing a uniform blend of a thermoplastic polymer and an additive therefor, said process comprising:

(i) forming a mixture of said thermoplastic polymer, said additive, and a liquid medium which vaporizes readily;

(ii) feeding the mixture into contact with live steam flowing through a conduit and producing a mixture of fine droplets of the thermoplastic polymer, the additive, said liquid medium, condensed water and steam, in said conduit;

(iii) introducing the mixture of step (ii) into an enclosed chamber adapted to permit removal overhead of said component which vaporizes readily, entrained condensed water and steam;

(iv) removing said component which vaporizes readily, condensed water, and steam from said chamber; and (v) collecting the uniformly blended thermoplastic polymer and additive therefor in a discrete particulate form from said chamber.

In especially preferred features of this invention, the additive will also be a thermoplastic polymer, e.g., a diorganopolysiloxane homopolymer or copolymer. While the thermoplastic polymers can vary broadly, the preferred ones for use are styrene homopolymer resins, styrene copolymer resins, e.g., styrene-acrylonitrile, and rubber modified styrene resins, aromatic polycarbonates, e.g., the condensation products of bisphenol A and phosgene, a polyphenylene ether resin, e.g., poly(2,6-dimethyl-1,4-phenylene)ether, or a mixture of any of the foregoing. Particularly applicable are uses of the process for blending a styrene homopolymer resin, a rubber modified high impact polystyrene and a styrene-acrylonitrile copolymer resin; or a diorganopolysiloxane, particularly in the form of a gum, with a styrene resin. The liquid medium which vaporizes readily can vary broadly, but preferably, will be selected with the nature of the thermoplastic resin in mind. Preferably, it will be relatively inexpensive, such as a hydrocarbon, e.g., benzene or toluene, or a chlorinated derivative, such as methylene chloride, trichloromethylene or carbon tetrachloride. Methylene chloride is preferred.

The preferred styrene resin is one having at least 25% by weight of its polymer units derived from a vinyl aromatic compound of the formula:

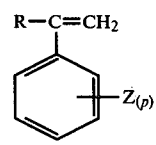

wherein R is hydrogen, (lower)-, e.g., $C_1$-$C_6$, alkyl or halogen; Z is vinyl, halogen or (lower)alkyl; and p is 0 or a whole number of from 1 to 5. The term "styrene resin" as used herein and in the appended claims, and as defined by the above formula includes, illustratively, homopolymer, such as polystyrene and polychlorostyrene, and rubber modified polystyrenes, such as rubber modified high impact polystyrene, and the styrene containing copolymers, such as the styrene-acrylonitrile copolymers (SAN), styrene-butadiene copolymer, styrene-acrylonitrilebutadiene terpolymers (ABS), poly-2-methylstyrene, copolymers of ethylvinylbenzene and divinyl benzene, and the like. The most preferred styrene resins are the styrene homopolymers and the rubber modified high impact polystyrenes.

The polyphenylene ethers, polycarbonate resins and diorganopolysiloxanes (silicones) are well known, and are articles of commerce.

DETAILED DESCRIPTION OF THE INVENTION

Referring to the drawing, thermoplastic resin and additive and readily volatile solvent are placed in agitated mixing tank 10 and then transferred with pump 12 through pipe 14 into live steam filled conduit 2, having a relatively long tail portion 3. Introduction of polymer feed is through the side arm 14 into conduit 3. The rapid volatilization of the feed solvent causes turbulence, and the feed is broken up into a particulate form which is carried into chamber 6. Located outside chamber 6 is a live steam generator 8 which is connected to conduit 2 and this, in turn, terminates within chamber 6 in a manner best designed to direct the discharge around the walls therewithin. The particles will swirl and pass downwardly, because of gravity, while the steam and volatile liquid component flash off (carrying some condensed, entrained water). The major proportion of volatile liquid component and the steam (water) mixture leaves vessel 6 at exhaust port 18, preferably, moving through conduit 26 and condenser 27 into solvent recovery separator 28. Heavier than water solvent, e.g., methylene chloride, can be removed from the bottom of decanter 28. Lighter than water solvents, e.g., benzene, can be removed from the top. The discrete, damp, but largely solvent-free particles of blended resinous composition are collected at bottom 34 of chamber 2. After drying, to provide final separation from any additional entrained gas and liquid, the particles are suitable for bagging, storage or for further formulation.

DESCRIPTION OF THE PREFERRED EMBODIMENTS

The following examples are added to illustrate but not to limit the scope of the invention. Unless otherwise stated, all parts are by weight.

EXAMPLE 1

A mixture of 17.9 parts by weight of dimethylpolysiloxane gum (viscosity $10^8$ cps. at 25° C.), 348 parts of polystyrene and 1% of dicumyl peroxide (based on the polysiloxane) are blended with 3120 parts by weight of methylene chloride in a tank similar to that shown schematically in the drawing. The mixture is then injected into a jet of live steam in a conduit, passing through a long tail pipe and into a cyclone. The product comes out the bottom of the cyclone as a damp powder (crumb), while the steam and solvent vapor go off overhead to a condensing and solvent recovery system.

A perfectly uniform blend is formed, which, after drying, can be compression molded into sheets of high quality, in comparison with those of blends made by extrusion.

EXAMPLE 2

The procedure of Example 1 is repeated, substituting for the polystyrene and the polysiloxane, a mixture of 33 parts by weight of polystyrene resin, 33 parts of high impact strength rubber modified polystyrene resin and 33 parts of a styrene-acrylonitrile copolymer, and using 891 parts of methylene chloride. The powder product is a uniform blend suitable for melt fabrication into pellets or directly into finished parts.

EXAMPLE 3

A solution of 20 parts of cyanoethylmethyl-dimethylsiloxane copolymer, 400 parts of styrene-acrylonitrile copolymer, and 0.2 parts of dicumyl peroxide in 3580 parts of methylene chloride is prepared. An intimate blend of the polymer and additives is isolated by the procedure of Example 1.

EXAMPLE 4

The procedure of Example 1 is repeated, substituting a suspension of 7.5 parts by weight of poly(2,6-dimethyl-1,4-phenylene) ether and 7.5 parts by weight of high impact strength rubber modified polystyrene in 85 parts by weight of toluene. The product is obtained as a free flowing powder, which is intimately blended and suitable for molding.

EXAMPLE 5

The procedure of Example 4 is repeated, substituting a solution in methylene chloride of the polycarbonate of bisphenol A and an acrylonitrile-butadiene-styrene terpolymer.

EXAMPLE 6

To a solution of 285 parts of high impact polystyrene in 2558 parts of methylene chloride is added 15 parts of a poly (diphenylsiloxane) gum with mixing. The resultant suspension is isolated by the procedure of Example 1. A uniform blend of these normally difficult to blend materials is thus obtained.

EXAMPLE 7

A solution of 300 parts of high impact polystyrene, 75 parts of dimethylpolysiloxane gum ($10^8$ cps. viscosity at 25° C.) and 2800 parts of methylene chloride is prepared. An intimate blend is isolated by the procedure of Example 1. Seventy-five parts of this blend is blended with 225 g. of high impact polystyrene beads in a one gallon can on a Red Devil paint shaker. The resulting blend is easily extruded and pelletized, demonstrating the very intimate mixing attained by the method of this invention.

In contrast, a direct blend of the high impact polystyrene beads and 1% of the dimethylpolysiloxane gum made conventionally is virtually impossible to extrude.

Obviously, other modifications in this invention are possible in view of the above examples and the teachings herein. For example, instead of using toluene or methylene chloride, the solvent for the feed can comprise benzene, trichloroethylene or xylene.

The invention in its broader aspects is not limited to the specification, methods, steps and improvements shown and described herein, but departures may be made within the scope of the accompanying claims without departing from the principles of the invention and without sacrificing its chief advantages.

I claim:

1. A process for producing a uniform blend of a thermoplastic polymer and an additive therefor, said process comprising:
   (i) forming a mixture of said thermoplastic polymer, said additive, and a liquid medium which vaporizes readily;
   (ii) feeding the mixture into contact with live steam flowing through a conduit and producing a mixture of fine droplets of the thermoplastic polymer, the additive, said liquid medium, condensed water and steam in said conduit;
   (iii) introducing the mixture of step (ii) into an enclosed chamber adapted to permit removal overhead of said component which vaporizes readily, entrained condensed water and steam;
   (iv) removing said component which vaporizes readily, condensed water, and steam from said chamber; and
   (v) collecting the uniformly blended thermoplastic polymer and additive therefor in a discrete particulate form from said chamber.

2. A process as defined in claim 1 wherein said additive is also a thermoplastic polymer.

3. A process as defined in claim 1 wherein said additive is a diorganopolysiloxane homopolymer or copolymer.

4. A process as defined in claim 1 wherein said thermoplastic polymer comprises a styrene homopolymer resin, a styrene copolymer resin, a polycarbonate, a polyphenylene ether, or a mixture of any of the foregoing.

5. A process as defined in claim 4 wherein said polyphenylene ether is poly(2,6-dimethyl-1,4-phenylene)ether.

6. A process as defined in claim 4 wherein the polycarbonate is a derivative of bisphenol A.

7. A process as defined in claim 2 wherein the blended composition comprises a styrene homopolymer resin, a rubber modified high impact polystyrene resin and a styrene-acrylonitrile copolymer resin.

8. A process as defined in claim 3 wherein the diorganopolysiloxane is blended with a styrene resin.

9. A process as defined in claim 8 wherein the diorganopolysiloxane resin is a dimethylpolysiloxane gum.

10. A process as defined in claim 1 wherein said liquid medium which vaporizes readily is methylene chloride.

11. A process for producing a uniform blend of a thermoplastic polymer and a diorganopolysiloxane additive therefor, said process comprising:
   (i) forming a mixture of said thermoplastic polymer, an additive selected from the group consisting of diorganopolysiloxane homopolymers or copolymers, and a liquid medium which vaporizes readily;
   (ii) feeding the mixture into contact with live steam flowing through a conduit and producing a mixture of fine droplets of the thermoplastic polymer, said diorganopolysiloxane additive, said liquid medium, condensed water and steam in said conduit;
   (iii) introducing the mixture of step (ii) into an enclosed chamber adapted to permit removal overhead of said component which vaporizes readily, entrained condensed water and steam;
   (iv) removing said component which vaporizes readily, condensed water, and steam from said chamber; and
   (v) collecting the uniformly blended thermoplastic polymer and diorganopolysiloxane additive therefor in a discrete particulate form from said chamber.

* * * * *